United States Patent [19]
Arias Carvajal et al.

[11] 3,892,727

[45] July 1, 1975

[54] TWO PIECE CARTRIDGE FOR MAGNETIC TAPES

[76] Inventors: Jose Antonio Arias Carvajal, 1010 Opalocka Blvd., Opalocka, Fla. 33053; Luis-Martin Mena Sanchez, San Ambrosio 8, Madrid, Spain

[22] Filed: Jan. 3, 1974

[21] Appl. No.: 430,514

[30] Foreign Application Priority Data

Feb. 13, 1973 Spain ............................ 188692/73

[52] U.S. Cl. ................................ 360/132; 242/197

[51] Int. Cl. ......................................... G11b 23/02

[58] Field of Search ..................... 360/132; 242/197

[56] References Cited

UNITED STATES PATENTS 3,796,394 3/1974 Souza ................................ 360/132

*Primary Examiner*—Vincent P. Canney
*Attorney, Agent, or Firm*—Wenderoth, Lind & Ponack

[57] ABSTRACT

A new type of cartridge for magnetic tapes having the same dimensions as known cartridges, i.e., approximately 64 mm. in width, 100 mm. in length and 9 to 11 mm. in thickness, wherein the cartridge is divided into two independent bodies, one acting as an auxiliary element and the other as a detachable portable element which is located within the auxiliary element. Two rotating friction rollers on the portable element provide mounting supports for the corresponding magnetic tape. The portable element has a head which bears the pressure pad and this portable element has a solidly fixed cover provided with spigots for the precise guiding and fastening of the magnetic tape.

7 Claims, 7 Drawing Figures

TWO PIECE CARTRIDGE FOR MAGNETIC TAPES

BACKGROUND OF THE INVENTION

The present invention refers to a new type of cartridge for magnetic tapes, composed of two independent elements which are so joined to each other at the time of use that one acts as a portable element, wherein the tape together with its reels and sliding rollers are housed, while the other acts as an auxiliary element, wherein the driving rollers which act by friction on the reels of the tape, are housed.

SUMMARY OF THE INVENTION

This design enables various portable elements to be placed successively on a specific auxiliary element. Thus the external dimensions of the assembly, which coincide with the conventional ones, can at all times be maintained and the assembly can be applied to any commonly known tape recorder of this type.

Comparing the dimensions of presently known cartridges which are of 100 mm. in length, 64 mm. in width and about 10 mm. in thickness with the dimensions of the portable element of the present cartridge, which are of 70mm. in length, 30 mm in width and about 6 mm in thickness, and bearing in mind that it is only necessary to replace and store the mentioned portable element, it will be seen that the dimensions of the cartridge of the invention have a much smaller volume than known cartridges. This concept is very important from a practical point of view with respect to transportation since only the portable element housing the tape need be stored and transported. The cartridge thus may be widely used in postal communications where letters are taped instead of written, as well as in any type of long distance communications.

BRIEF DESCRIPTION OF THE DRAWINGS

For a better understanding of the structure of the device, reference will be made to the following description, taken with the accompanying drawings, wherein.

DETAILED DESCRIPTION OF THE INVENTION

The external shape of the cartridge is identical to that of conventional cartridges and its power supply inlets are equally placed. It can, therefore, be used with any known tape recorder for this type of cartridge.

Figure 2:
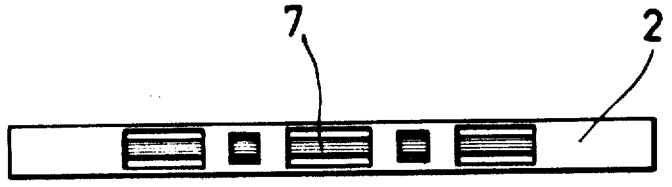
FIG. 2 is a front or exterior elevational view of same.
Figure 1:
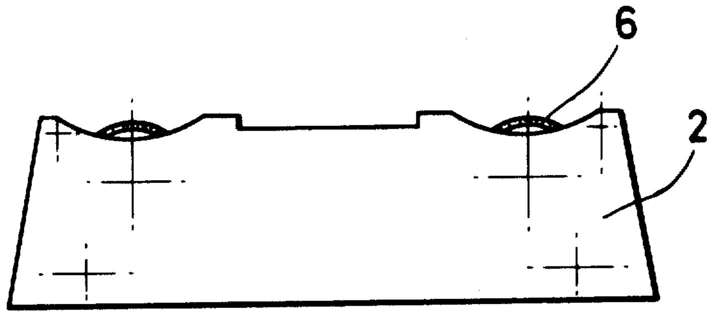
FIG. 1 is a plan view of the portable element of the cartridge.
Figure 3:
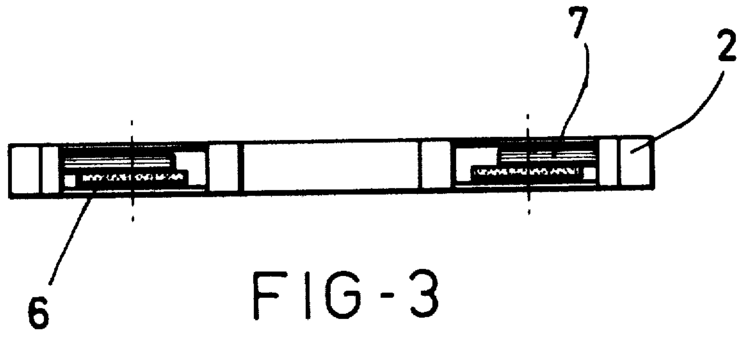
FIG. 3 is a rear or interior elevational view of same.
Figures 4, 5:
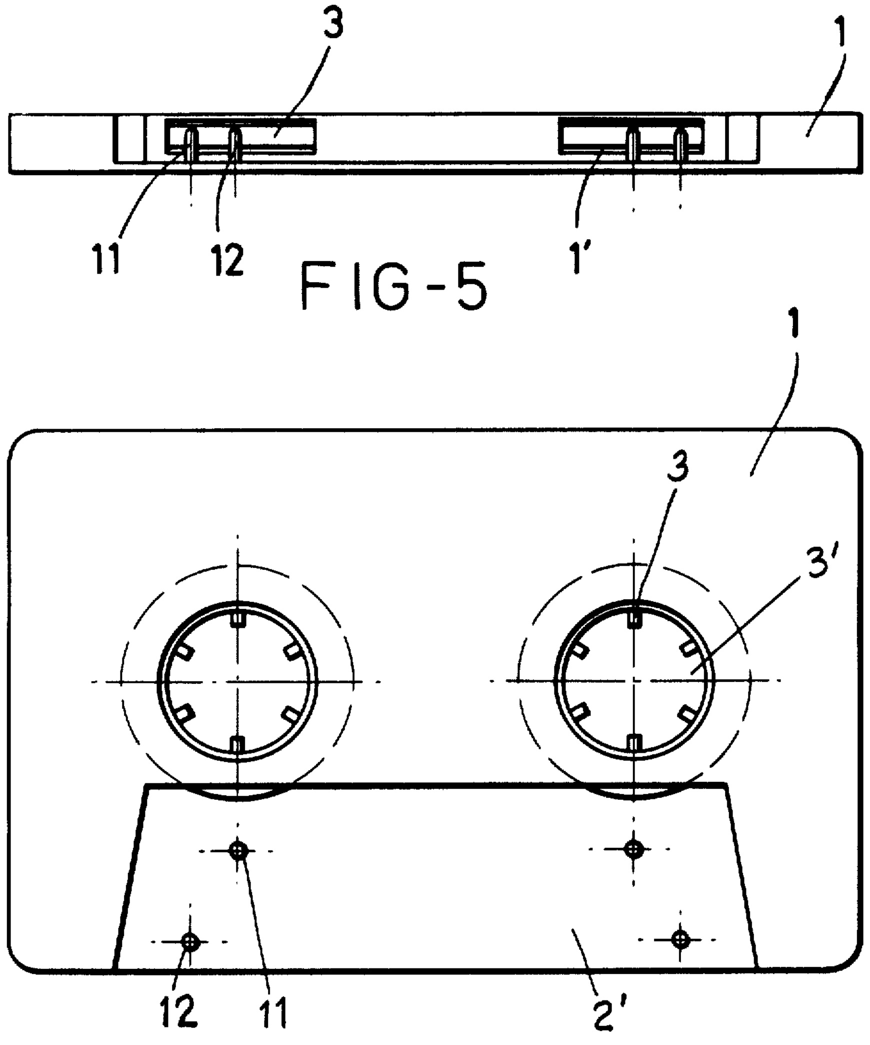
FIG. 4 is a plan view of the auxiliary element.
FIG. 5 is a front elevational view of same.
Figure 6:
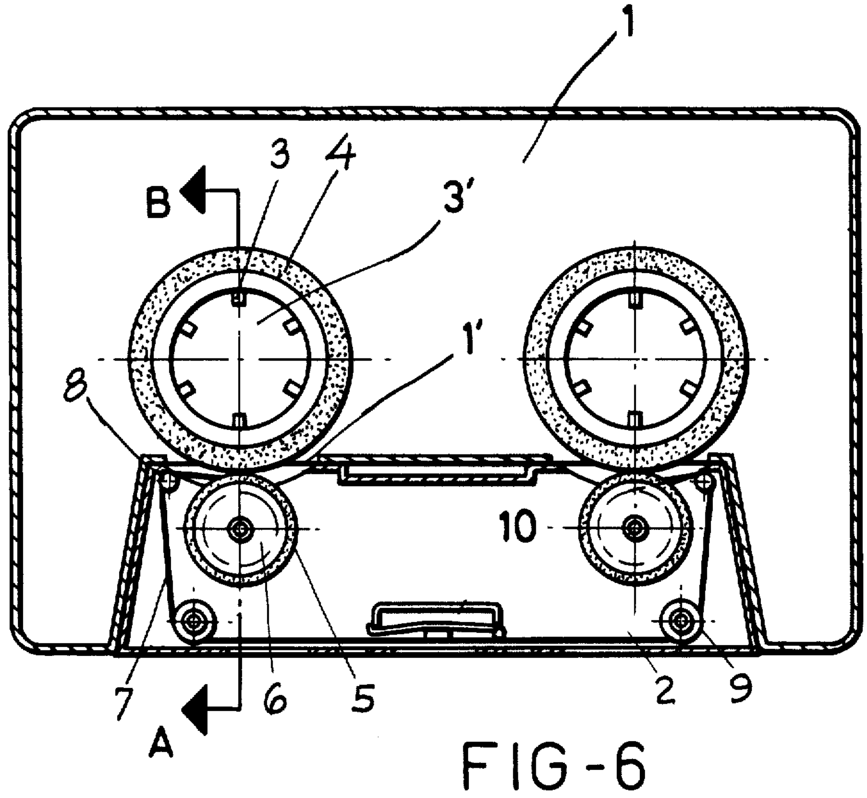
FIG. 6 is a plan section of the assembly.
Figure 7:
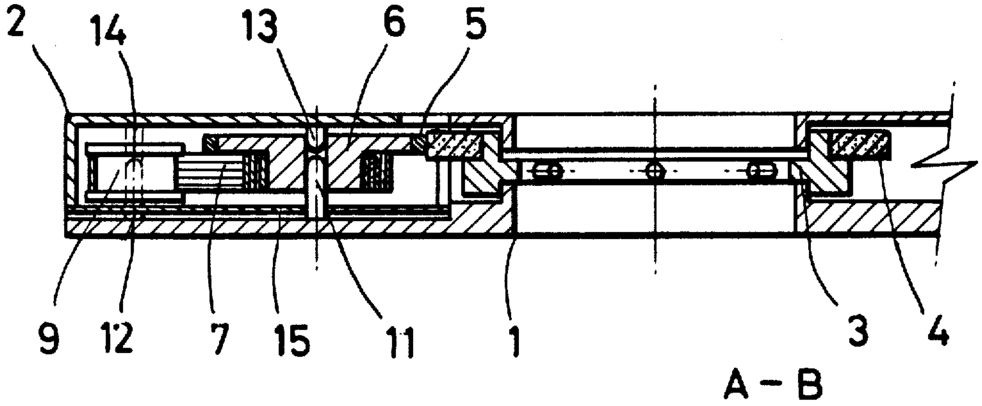
FIG. 7 is a cross section, taken along lines A-B in FIG. 6, of the shafts of a driving roller and its corresponding coils.

However, the cartridge is divided into two parts, one of which is an auxiliary element 1 and has the shape of a rectangular prism with a recess 2′ in the form of a trapezoidal prism 2′ therein. The lower surface of element 1, in recess 2′, has extending therefrom two pairs of shafts 11 and 12 which project vertically upwards. The assembly is completed by a portable element 2 which fits perfectly into the recess 2′ of the auxiliary element 1. Reels 6 of the tape 7 and the disc plate 10 which urges the tape against the recording head are housed within portable element 2. The exterior edge of element 2 is provided with windows which are identical to those of conventional cartridges and which can clearly be seen in FIG. 2.

The auxiliary element 1 receives movement from the motor of the tape recorder through shafts which enter into orifices 3′ of element 2, such shafts engaging or meshing with the teeth or spokes 3 on wheels which are concentric with orifices 3′. The periphery 4 high friction coefficient, and contacts periphery 5 of one of the high rubbing coefficient, contacts periphery 5 of the reels 6 housed in the portable element. The characteristics of peripheries 5 are similar to those of peripheries 4, and receive movement therefrom and transmit such movement to tape 7, which passes from one reel 6 to another, sliding on pivots 8 and idler rollers 9.

The portable element 2 has two small pins 13 and 14 which project downwardly from each side of the upper base thereof and which are housed in the hollow center openings of reels 6 and rollers 9, respectively. However, only the upper halves of such openings house pins 13 and 14, since the lower halves are occupied by the two pairs of pins or shafts 11 and 12, facing pins 13 and 14, which project from the upper surface of the recess 2′ of auxiliary element 1 and which extend through the lower base 15 of the portable element 2. Base 15 is formed of a suitable thin sheet of the same material as the remainder of the frame of element 2 and is breached by pins 11 and 12 at the time the portable element 2 is placed on the auxiliary element so that the cartridge can be used.

We claim:

1. A two-piece cartridge for magnetic tapes for use in a cassette cartridge receiving recording-reproducing machine, said two-piece cartridge comprising:

a portable tape-containing element housing therein a pair of tape reels and a magnetic tape extending between and wrapped around said tape reels, said portable element having therein windows adjacent said tape for receipt of magnetic heads of a recording-reproducing machine when said cassette is operatively positioned therein, the overall dimensions of said portable element being substantially smaller than the overall dimensions of a conventional cassette cartridge;

an auxiliary element comprising a body having overall dimensions equal to those of a conventional cassette cartridge, said auxiliary element having therein a recess dimensioned to receive said portable element, said auxiliary element having therein a pair of reel driving means, each of which has means thereon for receiving driving movement from said recording-reproducing machine when said auxiliary element is positioned thereon; and said portable element having therein openings, whereby when said portable element is operatively positioned in said recess of said auxiliary element, said reel driving means extend into said openings into driving engagement with said reels.

2. A two-piece cartridge as claimed in claim 1, wherein said pair of reel driving means comprises a pair of orificed wheels rotatably mounted in said body of said auxiliary element, and said means for receiving comprises spokes within the orifices of each of said wheels.

3. A two-piece cartridge as claimed in claim 2, wherein each of said reels has thereon a periphery of friction material, and each of said wheels has thereon a periphery of friction material, said reel and wheel peripheries being in frictional engagement when said portable element is positioned in said recess of said auxiliary element.

4. A two-piece cartridge as claimed in claim 1, wherein said portable element has further housed therein a pair of idler rollers; each of said reels and said idler rollers having therein an axial cylindrical passage; and pins means extending from said portable element partially into each of said cylindrical passages for positioning said reels and said idler rollers within said portable element.

5. A two-piece cartridge as claimed in claim 4, wherein said auxiliary element further includes a base surface extending across and forming a limiting wall of said recess; and means on said base surface for securely positioning said portable element within said recess.

6. A two-piece cartridge as claimed in claim 5, wherein said positioning means comprises shafts secured on said base surface and extending into said cylindrical passages of said reels and idler rollers when said portable element is positioned in said recess.

7. A two-piece cartridge as claimed in claim 6, wherein said portable element has a lower surface formed of a material easily breached by said shafts on said base surface.

* * * * *